United States Patent

[11] 3,584,713

| [72] | Inventors | Tatsuo Tani;<br>Yutaka Momose; Junichiro Oya, all of Kariya-shi, Japan |
|---|---|---|
| [21] | Appl. No. | 829,626 |
| [22] | Filed | June 2, 1969 |
| [45] | Patented | June 15, 1971 |
| [73] | Assignee | Aisin Seiki Company Limited<br>Aichi-ken, Japan |
| [32] | Priority | June 15, 1968 |
| [33] | | Japan |
| [31] | | 43/41266 |

[54] AUTOMATIC FOUR-WHEEL DRIVE MECHANISM
6 Claims, 5 Drawing Figs.

[52] U.S. Cl. .................................................. 192/38,
180/44, 192/45, 192/103
[51] Int. Cl. ........................................................ F16d 15/00,
F16d 43/04, B60k 17/34

[50] Field of Search ............................................. 19/35, 38,
45, 103 C; 180/44

[56] References Cited
UNITED STATES PATENTS

| 2,005,974 | 6/1935 | Hutchison, Jr. ............... | 192/103 (C) |
| 2,292,988 | 8/1942 | Bloomfield et al. ....... | 192/103 (C) (UX) |
| 3,300,002 | 1/1967 | Roper .......................... | 192/38 (XR) |

*Primary Examiner*—Allan D. Hermann
*Attorney*—Sughrue, Rothwell, Mion, Zinn & Macpeak ABSTRACT: An automatic automotive four-wheel drive mechanism, which is provided with a flywheel mass-type sensor operatively connected with the drive and driven wheels for sensing occasional speed differential therebetween, a two-way clutch being mechanically coupled with said sensor and adapted for actuation to couple said both shafts when the speed differential should exceed a predetermined value.

PATENTED JUN15 1971  3,584,713

AUTOMATIC FOUR-WHEEL DRIVE MECHANISM

This invention relates to automatic four-wheel drive mechanism adapted especially for automotive use.

Conventionally, this kind of four-wheel drive mechanism for wheeled vehicle allows the vehicle drive generally in such a way that under steady running condition the drive is applied to the rear wheel pair or front wheel pair only of the vehicle, as the case may be. The four-wheel drive is carried into effect when the vehicle is subjected to considerable acceleration or deceleration. More specifically, when the vehicle is intentionally accelerated in case of a rapid starting or of a passing acceleration stage, a high torque must be applied desirously to all of the vehicle wheels. On the other hand, the vehicle may be subjected to a considerable deceleration or even to an appreciable wheel slip, when the vehicle climbs along a steep road surface or runs on a muddy ground surface.

In this case, also, the four wheel drive mode must preferably be adopted for obviating otherwise caused difficulties. When the front or rear wheel drive is being adopted, substantially one half of the overall weight of the vehicle only is carried by the vehicle-driving wheels, the traction of the wheel tires with ground may amount to substantially one-half of the traction which can be attained with use of the four-wheel drive mode.

In this case, the engine torque may frequently overcome the wheel traction, resulting in a corresponding slip of the drive wheels on the ground.

The conventional four-wheel drive mechanism is so designed and arranged that it senses a differential rotation between the rear or drive wheels and the front wheels and when the differential should amount to a considerable value, the mechanism is brought into operation.

According to our calculation and practical experiments there is practically no differential rotation between the rear and front wheels during the regular low-speed starting, the second accelerating or the top speed constant running with use of conventional four-wheel drive mechanisms. Thus, with use of such conventional-type automatic four-wheel drive mechanisms as above mentioned, the operation thereof can be brought into effect only when the drive wheels are subjected to an amazingly large amount of drive wheel slip. It may be well assumed that the slip ratio under these operational conditions would amount to as high as 50 percent or more.

The automatic four-wheel drive mechanism according to this invention is so designed and arranged to sense the occasional acceleration or deceleration sharply and sensitively and it may be brought into operation even during a starting acceleration, a passing acceleration or the like vehicle-running stage, thus being capable of responding to frequent slips during running along a steep road surface or on muddy ground surface.

Therefore, the main object of the invention is to provide an automatic four-wheel drive mechanism which is highly sensitive to wheel differential rotation so as to meet every demand for the prevention of wheel slip.

A further object of the invention is to provide an automatic four-wheel drive mechanism of the above kind which is highly efficient and reliable in its function with a highly simplified and rigid construction.

These and further objects, features and advantages of the invention will appear from the following detailed description which follows hereinbelow by reference to the accompanying drawing which constitutes a part of the present specification.

Figure 1:
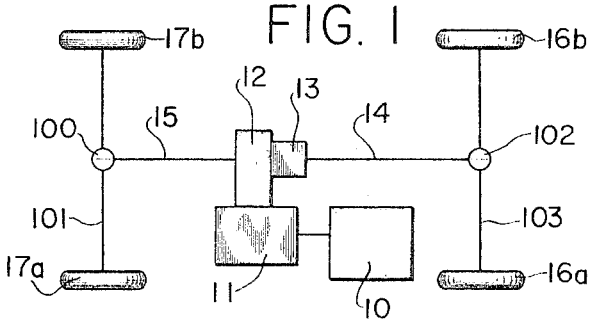
FIG. 1 is a schematic top plan view of an automotive vehicle on which an automatic four-wheel drive mechanism according to this invention is mounted.

Referring now to the accompanying drawing, especially FIG. 1 thereof, the numeral 10 denotes a conventional automotive internal combustion engine; 11 a conventional transmission mechanism drivingly coupled therewith; and 12 a conventional transfer unit mechanically coupled therewith. The numeral 13 denotes generally an embodiment of the automatic four-wheel drive unit embodying the principles of the invention which is arranged at the front output side of the transfer unit 12. This transfer unit is mechanically coupled with a conventional front propeller shaft 14 and through the drive unit 13. The front propeller shaft 14 is arranged to drive automotive front wheels 16a and 16b through differential gearing 102 and front axle 103. In the similar way, a rear propeller shaft 15 is arranged to drive automotive rear wheels 17a and 17b through differential gearing 100 and rear axle 101.

Figure 2:
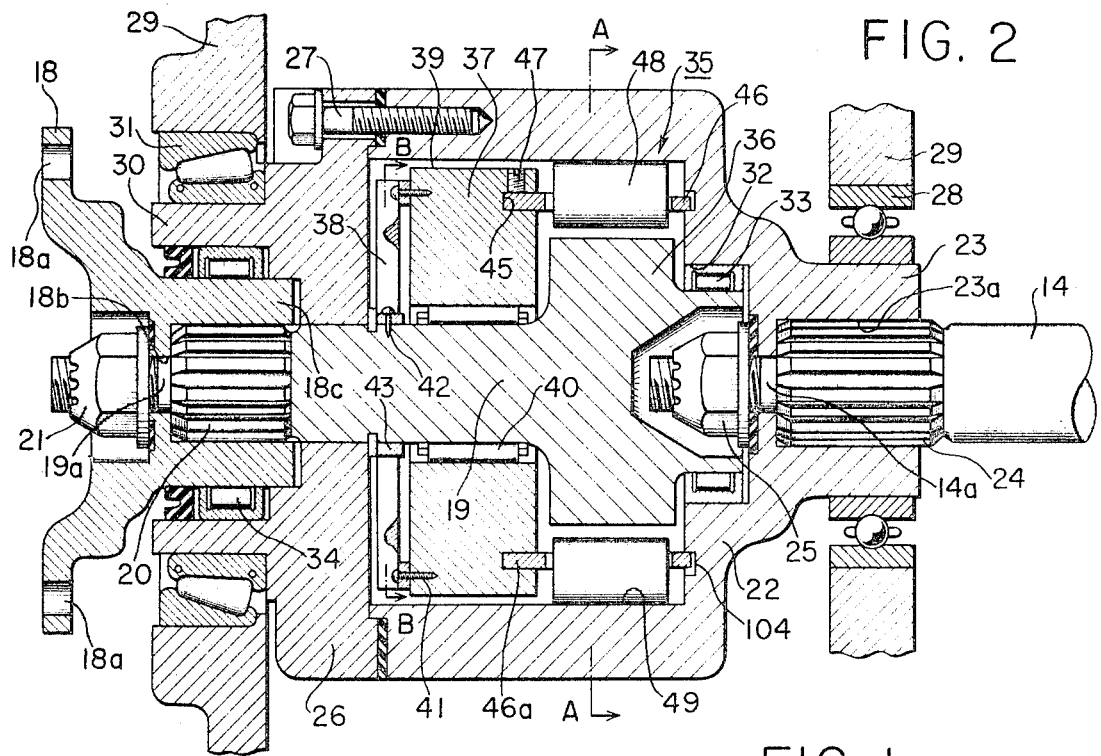
FIG. 2 is an enlarged detailed axial sectional view of the mechanism according to this invention.

The front output side of the transfer unit 12 is bolted through a plurality of bolt holes 18a, only two of the latter being shown in FIG. 2, to a flange 18 which is mounted at the input side of the automatic four wheel drive unit 13. The flange 18 is formed with a boss 18c which is provided with female spline teeth which are kept in meshing with corresponding male spline teeth 20 formed on a roller shaft 19, the latter being formed with a reduced extension 19a passing through a bore 18b of the coupling flange 18. The shaft extension 19a is provided with male screw threads and a fixing nut 21 is tightly attached onto said screw threads for fixingly attaching the flange 18 to the left-hand end of the roller shaft 19 in FIG. 2.

A housing 22 of the four-wheel drive unit 13, housing therein substantial part of the roller shaft, is formed at the output side of said unit 13 with a reduced projection 23 having a splined bore 23a which receives the correspondingly splined end 24 of the front propeller shaft 14 which is formed with a male threaded shaft extension 14a which receives a fixing nut 25 for fixedly and mechanically connecting the housing 22 to the left-hand end of the front propeller shaft 14. An axially bored cap member 26 is fixedly, yet detachably attached by means of a plurality of fixing bolts 27, only one of the latter being shown in FIG. 2, to the left-hand open end of the housing member 22 which is rotatably supported with its projection 23 through antifriction bearing 28 on a part of conventional automotive chassis frame 29 shown only partially for simplicity. The cap member 26 is formed with an outwardly and axially extending reduced and hollow cylindrical extension 30 which is rotatably supported through antifriction bearing 31 on the same vehicle chassis 29. From the foregoing, it will be clear that the housing assembly 22—26 is adapted for unitary rotation with the front propeller shaft 14.

Roller shaft 19 is rotatably mounted with its right-hand end, FIG. 2, by means of antifriction bearing 33 on a shoulder 32 formed on the inside wall of housing member 22, while the left-hand end of the roller shaft 19 is rotatably mounted through its rigidly coupled flange 18 by means of antifriction bearing 34 on said cylindrical extension 30. From the foregoing, it will be easily understood that with rotation of the rear propeller shaft 15 the roller shaft 19 rotates relative to the housing assembly 22—26 which is rotated from the front propeller shaft 14.

A hexagonal cam 36 of a two-way clutch 35 is made integral with roller shaft 19. The four-wheel drive assembly 13 comprises mainly the two-direction clutch 35 and a rear wheel acceleration sensing mechanism 39 comprising in turn a flywheel mass 37 fitted with a plurality of radial spring leaves 38.

Figure 4:
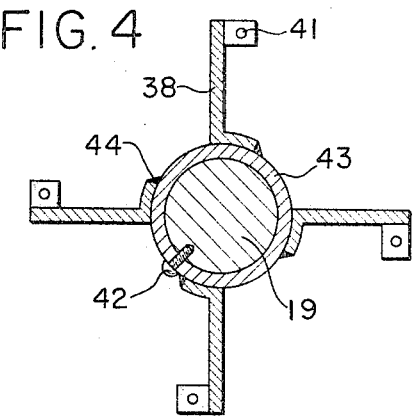
FIG. 4 is a cross-sectional view taken substantially along the section line B-B in FIG. 2.
Figure 3:
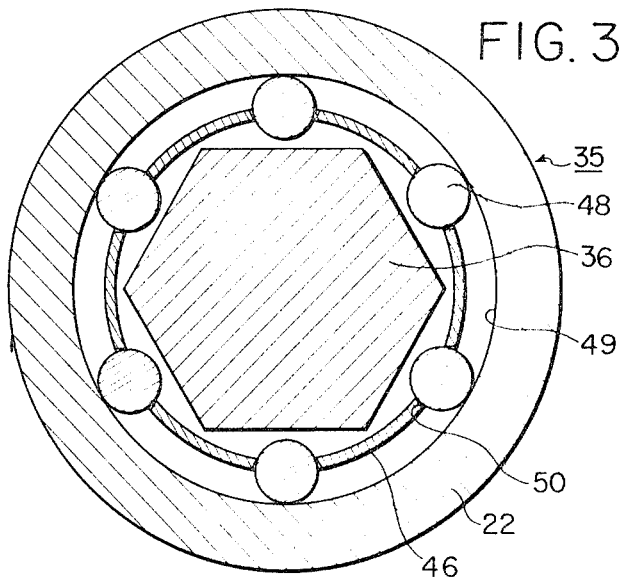
FIG. 3 is a cross-sectional view of the mechanism shown in FIG. 2, the section being taken substantially along the section line A-A in FIG. 2.

The flywheel mass 37 is rotatably mounted on roller shaft 19 by means of antifriction bearing 40; the outer end of each of said radial springs is fixedly attached by means of setscrew 42 to the flywheel mass, while the inner end of each spring is fixedly welded to a ring 43 which is fixedly attached to said roller shaft 19 by means of a plurality of setscrews 42. On the right-hand end surface of flywheel mass 37, there is provided a concentric groove 45 and said two-way clutch 35 is provided with a cage 46 which is inserted partially into the groove 45 and kept fixedly in position by means of screw means 47, on the one hand, and in a closed ring groove 104 which is formed in the inside wall of housing member 22, on the other. Two-way clutch 35 comprises, in addition to said cage 46, a plurality of rollers 48; outer race 49; and said hexagonal cam 36. The roller 48 is kept in contact with the inside peripheral surface of outer race 49, yet normally being separated from contact with cam 36. For this purpose, each of said rollers 48 protrudes inwardly and partially from a circular perforation 50 which is formed through cage 46 and has a smaller diameter than that of the roller 48. As seen clearly from FIG. 3, these perforations 50 are distributed equidistantly over the cage 46. The spring support assembly for said flywheel mass 37 is shown in its cross section in FIG. 4.

Figure 5:
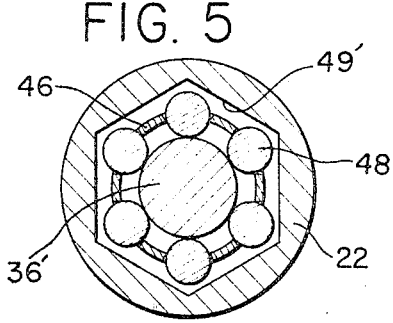
FIG. 5 shows a reduced cross-sectional view showing a modified arrangement from that shown in FIG. 3.

FIG. 5 represents a somewhat modified embodiment from the foregoing one. In this case, the outer race shown at 49 in FIG. 3 has been modified so as to provide an internal hexagonal cam 49' and the hexagonal outer cam shown at 36 in FIG. 3 has been transformed into the form of a circular shaft 36'. In the present modification, rollers 48 are kept in contact with the shaft 36', yet normally separated from the internal cam 49'. It will be therefore seen that the present modified arrangement is a kind of mechanical reverse of the foregoing.

The operation of the mechanism so far shown and described is as follows.

Now, it is assumed that the vehicle is running in the regular way with the rear wheels being driven. Since the hexagonal cam 36 made integral with roller shaft 19 is direct coupled with the rear shaft 15 through coupling flange 18, the cam rotates in unison with the rear shaft by the drive force transmitted therefrom. The flywheel mass and the cage coupled therewith rotates in unison with the roller shaft 19 through the intermediary of supporting springs 38 because of the rigid connection of their inner extremities with the shaft 19. On the other hand, the housing member 22 and the outer race 49 fixedly attached thereto rotate in synchronism with vehicle front propeller shaft 14. Even when it is assumed that the vehicle runs at a certain constant speed, there will be a larger or lesser difference in rotational speed between the front and rear vehicle wheels on account of the driving torque applied only on the rear wheels which will generally rotate at a faster speed than the front wheels. The mutual relation among cam 36, cage 46 and rollers 48 is subjected no alteration, while between the assembly of these members, on the one hand, and the outer race, on the other hand, there will be a relative difference in their rotation. This differential rotation is allowed, however, the relative rotation between the rollers 48 and the outer race 49. In this case, the two-way clutch 35 is in its free state.

If, however, the vehicle is subjected to a starting acceleration, a sudden and severe acceleration for passing another or a deceleration in case of running on a muddy ground surface or steeper surface, and with the rear wheels driven, the engine torque may frequently overcome the wheel traction with the ground and the rear wheels may be subjected to a considerable acceleration. Thus, the flywheels mass 37 can not follow up with the rotation of the shaft 19, and the supporting springs are thereby flexed on account of the tendency of faster rotation of the shaft 19 than the flywheel mass 37, thus the inertia of the flywheel mass relative to said shaft attains an appreciable value. The rotational speed of the hexagonal cam 36 will become faster than that of cage 46 and rollers 48 directly coupled with the flywheel mass, and these rollers are brought into their locked condition by being pinched by outer race 49 and cam 36. In effect, rear shaft 15 and front shaft 14 are thus direct coupled, and the four wheel drive is brought into effect.

When it is desired to release the aforementioned mechanism from its four-wheel drive mode, the driver needs only to remove his foot from the conventional accelerator pedal, not shown, for the manipulation of change lever, again not shown, or to bring about the engine braking mode of operation, thereby the desired release being invited in an automatic way. In these cases, the front wheels have a tendency of faster rotation than the rear wheels, and the outer race 49 will rotate with higher speed than the cam 36, thereby bringing the rollers 48 into their released position and kept again in their neutral position.

When a sudden and considerable braking action is applied to the running wheels, the front or rear shaft, as the case may be, is locked suddenly. In this case, the four-wheel drive mechanism is also brought into operation. The release operation may be carried into effect in the same way as was referred to hereinbefore. By the provision of said four-wheel drive mechanism, braking effort can be applied to all the four vehicle wheels in a highly evenly distributed way and thus, a maximum possible deceleration of the vehicle can be realized.

As will be clearly understood, the degree of relative acceleration or deceleration between the front and rear propeller shafts is sensed sharply in the mechanism embodying the principles of the invention by means of a rotating inertia mass. Therefore, the automatic four-wheel drive mechanism so far shown and described is capable of responding quickly and sharply to any appreciable amount of the developed acceleration frequently encountered, not only in case of a starting acceleration, passing acceleration or the like stage of an automotive vehicle, but also in the case of decelerated running of the vehicle on a muddy or steep ground surface while subjecting to a slip of the wheels, for bringing the four drive mechanism into operation. On the other hand, when the vehicle is running under steady conditions, the mechanism is kept in its nonactuated condition. In addition, when an appreciable braking effort is applied to the vehicle four wheels, the mechanism is also brought automatically into actuation for the prevention of otherwise frequently encountered lock of the front wheels or rear wheels so as to distribute evenly braking effort among all of the vehicle wheels and thus to bring about a maximum possible decelerating effect upon the running vehicle. In addition, the four-wheel drive mechanism according to this invention is highly simple in its design and highly effective in its operation without encountering operational difficulties and troubles.

The embodiments of the invention in which we claim an exclusive property or privilege are defined as follows:

1. An automatic drive mechanism, comprising: first and second shafts; first and second relatively rotatable coupling members operatively connected respectively to the first and second shafts; an inertia sensor means for sensing a relative acceleration between the first and second coupling members and moving relative to the first and second coupling members to effectuate a driving connection of the first and second coupling members including a flywheel mass located about one of the coupling members and a spring means for operatively connecting the flywheel mass with the coupling member it surrounds; a two-way clutch means for coupling the first and second coupling members in response to the movement of the inertia sensor means and comprising a two-way clutch operatively connected to the flywheel mass, whereby a predetermined relative acceleration will activate the two-way clutch means to couple the first and second shafts through the first and second coupling members.

2. An automatic drive mechanism as in claim 1 where the two-way clutch means further comprises a cage; a plurality of rollers mounted rotatably therein and a hexagonal cam, the cage being supported by the flywheel mass adjacent the hexagonal cam on one coupling member.

3. An automatic drive mechanism as in claim 2 wherein one of the coupling members includes a race portion for the rollers of the two-way clutch means.

4. An automatic drive mechanism as in claim 2 wherein the first relatively rotatable coupling member surrounds the second relatively rotatable coupling member and the hexagonal cam is located on the first coupling member.

5. An automatic drive mechanism as in claim 2 wherein the first relatively rotatable coupling member surrounds the second relatively rotatable coupling member and the hexagonal cam is located on the second coupling member.

6. An automatic drive mechanism, comprising: first and second shafts; first and second relatively rotatable coupling members operatively connected respectively to said first and second shafts; an inertia sensor means for sensing an acceleration or deceleration of said first shaft and operating relative to said first and second coupling members to effectuate a driving connection of the first and second shafts, said inertia sensor means including a flywheel mass located about one of the coupling members and a spring means for operatively connecting the flywheel mass with the coupling member it surrounds; a two-way clutch means for coupling said first and second coupling members in response to the movement of the inertia sensor means, said two-way clutch being adapted for coupling said first and second shafts through said first and second coupling members when the rotational acceleration or deceleration of said first shaft becomes larger than a predetermined value.